Feb. 13, 1934.  R. HOOVER ET AL  1,946,909
STOCK QUOTATION BOARD
Filed April 3, 1931
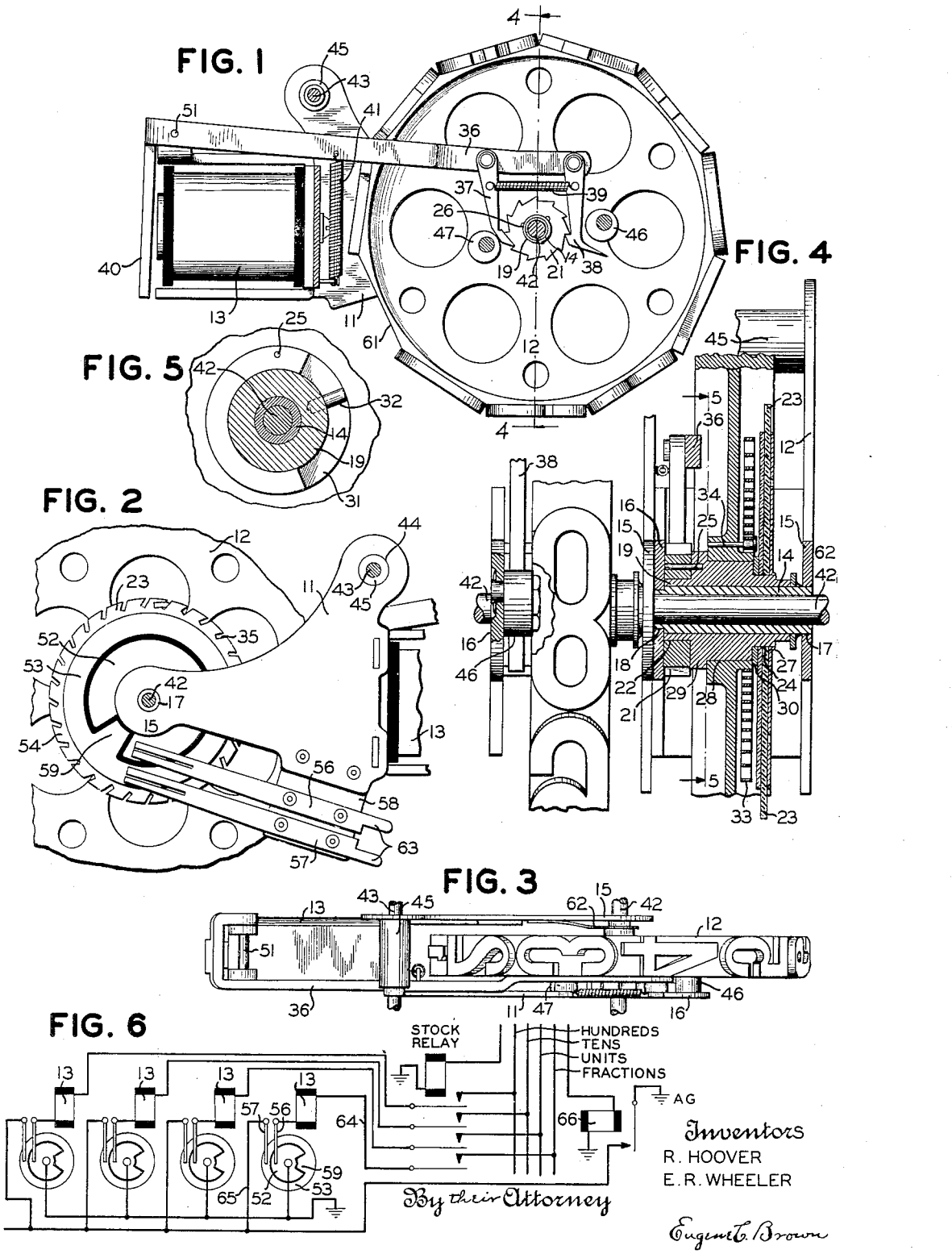
Inventors
R. HOOVER
E. R. WHEELER
By their Attorney
Eugene C. Brown Patented Feb. 13, 1934

1,946,909

UNITED STATES PATENT OFFICE 1,946,909

STOCK QUOTATION BOARD

Ray Hoover and Evan R. Wheeler, New York, N. Y., assignors to The Western Union Telegraph Company, New York, N. Y., a corporation of New York Application April 3, 1931. Serial No. 527,588

28 Claims. (Cl. 178—24)

This invention relates to a quotation board mechanism and more particularly to apparatus for visibly indicating or posting automatically information concerning different items such as stock, bond, and commodity quotations in response to telegraphic signals, such indication or posting being accomplished by printing the information, preferably, on tapes of papers or other material; and it has for an object to provide an improved type wheel unit for use in the printing unit in such apparatus.

One system of posting stock quotations automatically at a plurality of separate places, such as brokers' offices and banks, from a common transmitting point, now in use, involves the use of four channels of communication extending between the transmitting station and the receiving station embodying the quotation board apparatus, separate channels being employed to transmit signals corresponding to each of the hundreds, tens, units, and fractions (in eighths) values of the quotation. The four transmitting channels may comprise four separate line wires or two line wires, each having battery of positive and negative polarity applied alternately thereto in a series of impulses, in conjunction with polarized relays at the receiving station, for responding to the polarity of the current transmitted over each of the lines.

The quotation board as heretofore constructed employs a group of four indicating units each having a dial or drum bearing the numerals 1 to 9, 0 and a blank, four units being disposed side by side behind suitable apertures so that when properly set up the numerals on the dials may be directly observed to give the quotation. Ordinarily, five of such groups of indicators are provided for each stock or item, corresponding to the quotation "ranges" chosen to be posted, such as "yesterday's close", "open", "high", "low", and "last" quotations of the stock.

In a system described and claimed by Ray Hoover and Evan R. Wheeler in an application entitled "Printing quotation board", filed May 9, 1930, Ser. No. 451,140, and assigned to The Western Union Telegraph Company, it has been proposed to use, in place of one or more of the five "range" groups of indicators provided for each stock, a printing unit which will make the information visible in printed form on a paper tape or other sheet material. This arrangement enables the quotations to be kept in view for an extended length of time, and maintained in view after other quotations have been printed on the tape and thus indicate what is termed the "trend" of the stock being quoted upon.

The printing unit described in the above entitled application and which is to be substituted for one or more range groups has a type wheel corresponding to each indicator wheel in the indicating systems now in use, that is, a type wheel is used for each of the four transmitting channels corresponding to hundreds, tens, units and fractions. A ratchet wheel and control commutator are provided for each type wheel. The type wheels are assembled on a common shaft and are separated by spacing plates having one end supported on the shaft. On the spacing plates a pawl mechanism for each type wheel is pivotally mounted and arranged to engage the ratchet wheel. The magnets for actuating the pawl are supported independently of the spacing plates on a bar extending transversely of the type wheels and to the rear thereof. It is evident, therefore, that with the several parts of each type wheel unit supported in this manner, a considerable difficulty will be encountered in securing and maintaining the proper adjustment of the parts to insure the desired efficient and rapid operation of the apparatus.

We have, therefore, conceived the idea of constructing each type wheel unit as a separate and independent unit which may be assembled independently of the other parts of the printing unit and properly adjusted, at the time of assembly, and later inserted in the printing unit as an integral part of the same, which may be removed or replaced without regard to the other parts of the printing unit and without the difficulty of securing proper adjustment of the parts after being inserted into the printing unit.

Therefore, the present invention has for another of its objects to provide an arrangement embodying an independent mounting for each type wheel with which is assembled the parts required to actuate the type wheel and to control the restoration of the same to a predetermined or blank position, and which will enable all of the parts associated with one type wheel to be handled as an integral part of the printing unit in the type of system referred to above.

Another object of this invention is to provide for securing accurate axial alignment of the several type wheels in each printing unit, this objective being attained by providing hollow shafts or spacing members to extend transversely of the framework of the several type wheel units and rotatable to support the type wheels and, by providing in addition, a stay rod upon which the units are mounted and aligned by passing the hollow shafts over the stay rod, one after another, and thus position all of the type wheels about a common axial member.

Another object is to provide an improved adjustable resilient driving connection between the type wheel and its driving member.

Another object of our invention is to provide an improved type wheel control commutator of more compact form and one which will serve the dual function of supporting the contact segments and of providing a retaining means for the spring or other member utilized to provide the resilient drive connection between the ratchet wheel and the drive wheel.

Still another object is to provide a compact and dependable type wheel assembly in a printing unit, of the type referred to, which shall be of simple and durable construction, accurate, and very rapid in operation.

These and other objects are effected by our invention, as will be apparent from the following description and claims taken in connection with the accompanying drawing forming a part of this application, in which:

Fig. 1 is a side elevation of a type wheel unit showing the arrangement of the various parts in relation to the supporting framework;

Fig. 2 is a fractional side elevation of the opposite side of the type wheel from that shown in Figure 1, showing the commutator;

Fig. 3 is a plan view of an assembled type wheel unit;

Fig. 4 is an enlarged fractional view showing two units side by side, one in vertical section taken on the line 2—2 of Fig. 1, and the other in elevation;

Fig. 5 is an enlarged fractional view of the hub of the type wheel, taken along the line 5—5 of Fig. 4; and Fig. 6 is a diagram of the portion of the circuit required to actuate the type wheels of a printing unit comprising four type wheel units.

Inasmuch as the printing unit of which our improved type wheel unit forms a part, and the system in which such printing unit is utilized, is fully described in the above mentioned application of Hoover et al., no further description of the type wheel unit disclosed in that application, and upon which the invention disclosed in this application is an improvement, will be given.

According to our invention, each of the type wheel units in the type wheel assembly forms a part of the printing unit and is constructed as an entirely separate and integral unit which may be inserted and removed from the type wheel assembly without in any way disturbing the adjustment of the parts or interfering with the other units or the adjustment of their parts. The type wheels of the several units are rotatably mounted on hollow shafts or spacing members and arranged with their framework in a side by side relation and with the type wheels held in axial alignment by means of an aligning member, preferably in the form of a bolt or stay rod, which passes serially through the hollow shafts of the several units. Each of the units as constructed according to this invention is complete within itself apart from the assembly and the aligning element.

Referring now to the drawing, we show in Figs. 1, 2, 3, and 4, one of our improved type wheel units which comprises a framework 11, which, as shown in plan in Fig. 3, is substantially U-shaped, a type wheel 12 having a series of characters at its periphery and carried at one end of the framework, and an operating magnet 13 carried at the other end of the framework. The type wheel is rotatably supported on a hollow shaft or spacing member 14, extending transversely between side arms 15 and 16 of the framework. One end of the hollow shaft 14 rests in an opening 17 near the outer end of the arm 15. The other end rests in an opening 18 near the outer end of the arm 16. A sleeve 19 surrounds the hollow shaft and carries a ratchet wheel 21, preferably, at one end on a reduced portion 22 of the sleeve and a control commutator 23 on another reduced portion 24 at the other end of the sleeve. The ratchet wheel is secured to the sleeve by pin 25 and by portions of the sleeve, as shown at 26, being upset into the face of the ratchet wheel. The commutator is retained in a fixed relation relative to the ratchet wheel by upsetting portions of the other end of the sleeve into the outer face of the commutator, as shown at 27.

The type wheel 12 is mounted on an enlarged central portion 28 of the sleeve 19. It is retained against longitudinal movement with respect to the sleeve by a shoulder 29 at one end integral with the sleeve, and at the other end by a washer or removable collar 30 held in place by the commutator 23. As shown in Fig. 5, the hub of the type wheel has a short recess 31 in one side thereof, and the outer sleeve, over which the hub of the type wheel is fitted, has a radially extending pin 32 fixed thereto and extending out through the recess, whereby relative rotation of the type wheel and ratchet wheel may occur. The pin 32 is normally retained against the rear wall of the recess by spiral spring 33 disposed about the other end of the hub of the type wheel and attached at its inner end to an axially extending pin 34 set in the side of the type wheel, and at its outer end in one of a plurality of serrations 35 provided at the periphery at the commutator 23.

The type wheel has eleven flat faces formed on its rim. Ten of the faces bear the characters 1 to 9 and 0, one of the faces being blank. The type wheel rotates in a counter clockwise direction as viewed in Fig. 1 and is moved the distance of one character, or one eleventh of a revolution, for each impulse of the actuating magnet 13. The type wheel is rotated by the ratchet in a step by step movement produced through a pawl arm 36 having a pair of pallets 37 and 38 which alternately engage the teeth on opposite sides of the ratchet wheel. A spring 39 holds the pallets in engagement with the ratchet wheel. An armature 40 extends from the left end of the pawl arm, near its pivot point, across the rear face of the magnet. Each stroke of the armature in a closing direction, in response to an electrical impulse transmitted to the magnet 13, causes the pawl arm to move upwardly which, with the outer pallet 38 at the right end of the pawl arm in engagement with the face of a tooth of the ratchet wheel, rotates the same counter clockwise one twenty-secondth of a revolution. Upon release of armature the pawl arm is moved downwardly by a retractable spring 41 which, with the inner pallet 37 in engagement with the face of a tooth on the other side of the ratchet wheel, moves the latter in the same direction another twenty-secondth of a revolution.

From the foregoing, it will be observed, that all the parts which comprise a complete type wheel unit are assembled in the framework 11 and are supported thereby in operative relation. In this way such minor adjustments as are necessary to insure the most efficient operation of the parts of each unit can be made at the time the unit is assembled. After the units are assembled and adjusted, a suitable type wheel assembly for a printing unit may be set up by arranging any desired number of these units, ordinarily four units, side by side with means to retain them in proper alignment. The essential requisite of securing proper alignment of the units is to position the axes of the several type wheels on a common axial line and provide means for maintaining this position. This is obtained by providing an aligning member, preferably, in the form of a bolt or stay rod 42 suitably mounted in the housing (not shown) of the printing unit and over which the hollow shafts 14 of the desired number of type wheel units are passed one after another and secured in side by side relation. In this manner, the several type wheels are centered upon a common aligning member and their axial alignment is assured and the presentation of the characters carried by the type wheel on an even line will be maintained.

Since the stay rod 42 extending through the hollow shafts 14 is located at one end of the framework 11, it is desirable to provide a supplementary supporting means for the other end of the framework. This is provided, preferably, in the form of a stay rod 43 arranged to extend through an opening 44, adjacent to the other end of the framework, in which opening, a tubular spacing member 45 is secured and arranged to surround the stay rod 42.

From the foregoing, it is evident that even though the character or type carrying wheel unit has been described as a part of a printing unit, the unit is equally adapted to be used as an indicator unit. It will be apparent to those skilled in the art, that the unit such as described above will function equally well to rotate the proper character to display position before a suitable opening or aperture provided at the front of the unit, it merely being necessary to so dispose the commutator and character type wheel in relation to each other that when the wheel is set, the unison position of the wheel and the display position of the characters will occur before the aperture instead of before the printing platen as hereinafter described.

In the normal operation of the quotation board the operating impulses are transmitted at a rate of from twenty to thirty signals per second, and the type wheels, therefore, must rotate into printing position at a rate of from two to three revolutions per second. Due to the relatively large diameter of the type wheels required to produce printed characters readable at a considerable distance from the board and to the concentration of the mass of the wheel at the periphery, the type wheels possess considerable inertia to starting. In order to reduce the load of starting on the magnets and to bring the type wheels into motion gradually, the initial movement of the ratchet wheel 21 is communicated to the type wheel 12 through the spiral spring 33. The type wheel follows the movement of the ratchet wheel and comes to rest against the rear wall of the arcuate recess 31 in the hub of the type wheel.

Similarly, a type wheel when once set in motion, possesses considerable momentum and, therefore, in order to prevent the type wheel from overrunning the movement transmitted thereto by the operating impulses of the pawl mechanism and thus being carried beyond printing position, a special arrangement is provided for locking the pallets 37 and 38 of the pawl 36 against the ratchet wheel as the pallets reach the limit of their up and down movement. This locking arrangement comprises stop pins 46 and 47 disposed on opposite sides of the ratchet wheel and adjustably secured to the arm 16 of the framework 11, as shown in Fig. 4. The stop pin 47 on the left side of the ratchet wheel 21 is so arranged that when the pallet 37, engaging that side of the ratchet wheel, reaches the extremity of its downward movement, it will be "jammed" between the stop pin and the back of the ratchet teeth. This is accomplished by arranging the back portion of the engaging end of the pallet 37 with a face inclined away from the pivoted end of the pawl, which causes the pallet to move toward the right as it strikes the stop pin. Likewise, the stop pin 46 at the opposite side of the ratchet wheel is so arranged that a projection provided on the back of the engaging end of the pallet 38 will cause the engaging end of the pallet to move to the left as it comes in contact with the stop pin and be jammed between the stop pin 46 and the back of the ratchet teeth. Consequently, the momentum of the type wheel communicated through the ratchet wheel is insufficient to force the pallets of the pawl out of engagement with the back of the ratchet teeth, and the type wheel is positively stopped in the correct position.

The stop pins 46 and 47 are made adjustable for an additional reason. It will be remembered that the signal impulse energized the magnet 13 to operate the pawl arm 36 to drive the ratchet wheel through the pallet 38 in one direction to move the type wheel through a part of the space of one character, and that the pawl arm moves against the tension of the retractable spring 41 which in turn acts to move the pawl arm in the other direction to drive the ratchet wheel through the pallet 37 for the remaining part of the space of a character. The signal impulses which operate the type wheel unit will not be uniform in every case but will vary according to the condition of the circuits and the strength of the impulse. Furthermore, it is difficult to obtain retractable springs of absolute uniformity.

It is obvious, therefore, that the two forces applied to the ratchet wheel during the up and down movement of the pawl arm will, in most instances, be unbalanced or unequal. In other words, the force of the operating magnet over and above that required to carry the pawl arm 36 against the force of spring 41 will rarely be equal to or balanced with the force exerted by the spring in the opposite direction after the magnet has become deenergized. On the other hand, when these forces are being applied to the ratchet wheel in rapid succession to step the same around, a better response will be obtained when the effect of these two forces, which might be considered as plus and minus current forces, are balanced. Although the forces themselves cannot be readily balanced, the effect of the same on the rotation of the type wheel may be substantially balanced by adjusting the stop pins 46 and 47 to vary the length of the stroke of each pallet and thereby adjust the work done on the type wheel during each stroke in accordance with the unbalanced condition of the two actuating or stepping forces. In other words, the pallets are so adjusted that the one acting to transmit the greater operating force to the ratchet wheel will have the longer stroke while the one transmitting the lesser force will have the shorter stroke. In this manner the work done by the two forces operating upon the ratchet wheel in opposite directions is substantially balanced, resulting in a relatively smooth and more rapid stepping action than is otherwise obtainable.

Referring now to Fig. 1, it will be observed that the pawl 36 is pivoted on a pin 51 near the extreme left end of the framework 11 and to one side of the outer end of the electromagnet 13. The pawl has a portion 40 extending across the face of the magnet, forming an armature, by means of which the magnet actuates the pawl arm in response to electrical impulses. By pivoting the pawl at the outward end of the framework, a relatively long arm is obtained, thereby reducing the angular motion required to be made by the pawl arm in order to produce the necessary back and forth movement of the pallets in engagement with the ratchet wheel. The reduction of the angular movement of the pawl arm 36 makes it possible to arrange the movable armature 40 which actuates the pawl arm to have a relatively small movement; in other words, a smaller air gap can be utilized in the magnetic circuit set up between the magnet and the armature. The advantage of this arrangement, over pivoting the pawl arm at the inner end of the electromagnet, for instance, will be readily appreciated when it is remembered that the force exerted upon the armature varies as the square of the distance between the armature and the pole face, whereas, the force at the end of the lever arm of the pawl produced by a predetermined torque about its pivot point varies only in direct proportion to the length of the lever arm.

Obviously, the type wheel may be set in printing position by rotating the same from the last set position until the proper character is moved into printing position or the printing wheel be restored before each printing operation to a predetermined position, as for instance, with the blank position thereof in printing position, and then set in the correct printing position by transmitting to its operating magnet, impulses corresponding in number to the digit which it is desired to print. We prefer to employ the latter method of operation in order to bring the same into accord with the method employed for operating direct reading units which have been heretofore utilized in quotation systems, so that the printing mechanism may be operated in combination with an indicator board from the same signals employed for operating the indicator board.

The commutator 23 provides means for controlling the restoration of the printing or type wheel to such predetermined or blank position prior to transmitting the impulses corresponding to the new quotation.

Referring to Figs. 2 and 6 for a description of the commutator and the circuits which are controlled thereby, it will be seen that the commutator 13 comprises inner and outer conducting rings 52 and 53 secured to a disk 54 of non-conducting material. The inner and outer conducting rings are arranged concentrically and are disposed in spaced relation so as to be insulated one from the other. The disk of non-conducting material has a diameter substantially larger than the outer conducting ring 53 and has a series of serrations 35 cut inwardly from the periphery at an angle to the radius of the disk. In one of these serrations the outer end of the spiral spring 33, as already described, is secured. The provision of a plurality of serrations about the periphery enables the spiral spring to be wound or unwound to adjust the tension thereof and secure it to any position which will effect the desired tension.

As heretofore described, the commutator is secured in fixed relation to the ratchet wheel 21 and as a result, the conducting rings 52 and 53 of the commutator form contact members over which corresponding contact arms or brushes 55 and 56 drag as the commutator rotates with the ratchet wheel. The brushes 55 and 56 connect the segments or rings of the commutator in circuit, as will be presently described. They are secured to the framework 11 by being riveted to a section of non-conducting material 58 which in turn is riveted to the framework.

The inner conducting ring 52 has an arcuate portion cut away at one side thereof, and the outer ring 53 has a sector 59 which is disposed within the cut away portion of the inner ring. The sector 59 of the outer ring is insulated from the inner ring by being spaced therefrom. The commutator is mounted upon the ratchet sleeve 19 in such angular position that the sector 59 is engaged by the inner brush 56 when the blank portion 61 of the type wheel 12 is in printing position. The inner contact member or ring 52 is grounded by being joined to the ratchet sleeve 19, which in turn is grounded through a spring strip 62 mounted on the framework so as to press continuously against the end of the sleeve as it rotates. The brush arms are mounted so that the outer brush 57 drags on the outer conducting ring 53 continuously while the inner brush 56 drags on the inner conducting ring 52 at all times except when the inner projecting sector 59 of the outer ring comes underneath the brush. The outer ends of the brushes are provided with lugs 63 for making electrical connections thereto. As shown in Fig. 6, the lug of the inner brush 52 is connected to one terminal of the operating magnet 13, the opposite terminal of the magnet being connected to a line 64 from which it receives the signal impulses, as is more fully shown and described in the aforesaid Hoover et al. application, and the lug of the outer brush 57 is connected by a conductor 65 to a contact of a grounding relay 66 shown in Figure 6, and operated by a selecting mechanism whereby it may be selectively grounded.

The improved type of commutator just described will be observed to have both of the conducting rings or segments disposed on the outer face of the disk of non-conducting material. This leaves the inner face of the disk free from contact members and enables the latter to form, in combination with the type wheel, side retaining members for the spiral spring 33. Referring to Figure 4, it is evident that such an arrangement enables the type wheel unit to be constructed as an extremely compact unit. In addition, both of the conducting rings having been disposed on one face of the commutator disk, the contact fingers can be arranged side by side to engage one side of the commutator disk only and can be easily secured to the framework in a position readily accessible for inspection and adjustment.

The operation of the commutator is as follows. When it is desired to restore the printing wheels to their predetermined initial position prior to making a new setting, ten restoration impulses are supplied to the operating magnets 13 of the type wheel units through the selecting apparatus, as is fully described in the aforesaid application, the operating circuit for the magnet being completed through the inner brush 56, inner ring 52, and the ground contact, as illustrated in the circuit diagram shown in Figure 6.

Assuming for instance, that the type wheel 12 of the unit illustrated is set to print the character for the numeral 6, the first five impulses would step the type wheel around to bring the numerals 7, 8, 9, 0, and the blank portion thereof, successively into printing position. At the moment the blank portion of the wheel reaches the printing position the inner brush 56 engages the sector 59 of the commutator which, as stated before, is insulated from the inner grounded ring 52. The outer segment 53 of the commutator, of which the sector 59 forms a part, is ungrounded by the selecting mechanism at this time, and consequently the circuit of the magnet 13 is not completed during the transmission of the remaining five restoration impulses. The type wheel, therefore, remains set in its unison or blank position at the end of the transmission of the restoration impulses.

Ten unison or restoration impulses enable the type wheel to be set in blank position in the most unfavorable previous setting thereof, that is, with the numeral 1 in printing position.

At the conclusion of the restoration impulses, the selecting mechanism, as set forth in the aforesaid application, operates to apply the actuating ground AG through the outer brush 57 to the outer sector by means of the circuit established through the relay 66 shown in Figure 6. The required number of impulses for stepping the type wheel into the new position may then be transmitted, the grounded circuit of the magnet 13 being completed through the outer segment 53 and the outer brush 57. As soon as the first impulse is received the commutator rotates to place the inner segment 52 in engagement with the inner brush 56 so as to restore the normal ground to the magnet, the actuating ground at the same time being removed from the segment 53 in readiness for the next restoration cycle.

From the foregoing, it will be noted that a type wheel unit, for use in constructing a printing unit, which forms a part of a system for quotation of stocks or other items by means of telegraphic signals has been provided which may be assembled and adjusted as a complete unit and which may be associated with other units to form the type wheel assembly. In addition, means are provided for effectively maintaining the several type wheels in axial alignment to insure efficient printing of the characters in legible form. The type wheel unit constructed according to this invention is, furthermore, rapid in operation and will keep pace with the indicator units or other registering means now in use and operates on the same signals whereby printing quotation boards, indicator quotation boards or combinations of indicator and printing quotation boards may be operated from the same transmitting system.

While we have shown our invention in but one form, it will be obvious to those skilled in the art that it is not so limited, but is susceptible to various changes and modifications without departing from the spirit thereof, and we desire therefore, that only such limitation shall be placed thereupon as are imposed by the prior art or as are specifically set forth in the appended claims.

What we claim is:

1. An integral type wheel unit comprising a framework embodying a side, a hollow shaft supported at one end in the side of the framework, a type wheel rotatably mounted on said shaft, and means carried by the framework for rotating said type wheel into printing position.

2. An integral type wheel unit comprising a framework embodying sides, a tubular spacing member extending between the sides of the framework, a type wheel rotatably mounted on said spacing member, a driving element rotatably mounted on said spacing member and operatively secured to the type wheel, and means carried by the framework for actuating said driving element to rotate the type wheel into printing position.

3. An integral type wheel unit comprising a framework embodying sides, a tubular spacing member between the sides and transversely of the framework, a rotatable sleeve surrounding said spacing member, a ratchet wheel secured to said sleeve, a type wheel mounted on said sleeve and arranged to permit a rotary movement relative thereto, a resilient driving connection between the ratchet wheel and the type wheel, a pawl mechanism carried by said framework and arranged to engage, alternately, the opposite sides of the ratchet wheel to rotate the same step by step, electromagnetic means to actuate said pawl mechanism, and a commutator for controlling the electromagnetic means disposed to rotate about said shaft in fixed relation to one of said wheels.

4. A type wheel unit assembly comprising a plurality of integral units, arranged in side by side relation, and an aligning element, each of said units comprising a framework, a type wheel, a driving element for the type wheel, a hollow shaft carried by the framework to rotatably support the type wheel and driving element and means carried by the framework to actuate said driving element in response to signal impulses for rotating the type wheel into printing position, said aligning element being disposed to pass through the hollow shafts of the several units for holding the type wheels in axial alignment.

5. A type wheel unit assembly embodying a plurality of integral units, each of said units comprising a type wheel, a driving element for the type wheel, a hollow shaft upon which the type wheel and driving element are mounted, a supporting framework provided with openings to receive the ends of the hollow shaft, and means carried by the framework to actuate said driving element in response to signal impulses for rotating the type wheel into printing position, and means comprising a stay rod disposed coaxial with the type wheels and arranged to pass through the hollow shafts of the several units for holding all of the type wheels in the assembly in axial alignment.

6. A type wheel unit assembly embodying a plurality of integral type wheel units arranged side by side and a stay rod extending transversely through the several units for holding the latter in a fixed relation to each other, each of said units comprising a framework embodying sides, the sides of said framework being provided with openings through which the stay rod extends in transverse relation to the framework, a tubular spacing member surrounding said stay rod and extending between the sides of the framework, a type wheel rotatably mounted on said spacing member, a driving element operatively secured to the type wheel, and means carried by the framework for actuating said driving element to rotate said type wheel into printing position.

7. A type wheel unit assembly embodying a plurality of integral type wheel units arranged side by side and a plurality of stay rods extending transversely through the several units for holding the latter in a fixed relation to each other, each of said units comprising a framework embodying sides, the sides of said framework being provided with openings through which the stay rods extend in a transverse relation to the framework, a tubular spacing member surrounding each of the stay rods to properly position the type wheel unit on the stay rods, a type wheel rotatably mounted on the tubular spacing member surrounding one of the stay rods, a driving element also mounted on said latter spacing member and operatively secured to the type wheel, and means carried by the framework for actuating said driving element to rotate said type wheel into printing position.

8. A type wheel unit assembly comprising a plurality of separate framework units embodying sides and arranged in side by side relation, a hollow shaft extending between the sides of each framework unit, a type wheel rotatably mounted on each shaft, means carried by each framework unit for rotating the type wheel into printing position, and means comprising a stay rod passing through the several hollow shafts for holding the type wheels in axial alignment.

9. In a quotation board printing unit, a type wheel actuating unit comprising a framework, a type wheel rotatively mounted therein, and means for rotating the type wheel into printing position, said means including a ratchet wheel operatively secured to the type wheel, a pawl arm pivoted on said framework and operated in response to signal impulses, a pair of pallets carried by said pawl arm arranged to alternately engage opposite sides of said ratchet wheel to rotate the same step by step by applying a rotative force substantially tangentially to the periphery of the ratchet wheel.

10. In a quotation board printing unit for items to be posted, a type wheel actuating unit comprising a framework, a type wheel rotatively mounted therein, and means for rotating the type wheel into printing position, said means including an electromagnet mounted on said framework and disposed substantially in the plane of the type wheel, said electromagnet having a pivotally mounted armature disposed at the end thereof remote from the type wheel, a ratchet wheel operatively secured to the type wheel, a pawl arm carried by said armature and extending to one side of the axis of the type wheel, and a pair of pivotally mounted pallets carried by the pawl arm and arranged to alternately engage the opposite sides of the ratchet wheel and apply a rotative force thereto in a direction substantially tangentially to the periphery of the ratchet wheel.

11. In a quotation board printing unit, a type wheel unit, said type wheel unit comprising a type wheel, a framework extending radially of the type wheel, said framework embodying an arm at the inner end thereof on which the type wheel is rotatively mounted and an electromagnet at the outer end thereof, a ratchet wheel disposed axially of the type wheel and operatively secured thereto, a pawl arm pivotally mounted adjacent the outer end of the framework and embodying at the pivoted end thereof a transversely extending portion arranged to form a movable actuating armature across the outer end of the magnet, and a pair of pallets pivotally mounted on the free end of the pawl arm and arranged to alternately engage the opposite sides of the ratchet wheel to rotate the same as the pawl arm is successively actuated and released by the electromagnet.

12. In a quotation board printing unit, a type wheel unit, said type wheel unit comprising a type wheel, a framework extending radially of the type wheel, the type wheel being rotatively mounted at one end of the framework and an electromagnet mounted at the other end thereof, a ratchet wheel disposed axially of the type wheel and operatively secured thereto, a pawl arm extending substantially the full length of the framework and pivotally mounted adjacent the outer end thereof, an armature for the magnet, joined to the pawl arm, and a pair of pallets pivotally mounted on the free end of the pawl arm and arranged to alternately engage the opposite sides of the ratchet wheel to rotate the same as the pawl arm is actuated by the armature of the magnet.

13. A type wheel unit comprising a type wheel, a driving element for the type wheel, an insulating disk co-axial with the type wheel, a spiral spring operatively connecting the type wheel with the driving element and disposed intermediate the type wheel and one face of the disk, and electric contacts carried by the other face of the disk.

14. In a printing unit for items to be posted, a type wheel, means for setting said type wheel in printing position, said means comprising a ratchet wheel, an impulse pawl engaging said ratchet wheel to rotate the same step by step to position said type wheel, said type wheel and said ratchet wheel having interfitting members with abutting elements having play therebetween for providing a limited relative angular movement therebetween, a spring secured between the ratchet wheel and the type wheel and tensioned torsionally in such a direction as to bias the type wheel against the forward abutting elements for determining the normal position of the type wheel relative to the ratchet wheel and also transmit the driving force from the ratchet wheel to the type wheel, whereby a driving connection is provided which is yieldable in the direction of a driving force only.

15. A type wheel unit comprising a type wheel, a driving element for the type wheel, an insulating disk co-axial with the type wheel and secured in fixed relation with the driving element, a spiral spring operatively connecting the type wheel with the disk for rotating the type wheel in accordance with the movement of the driving element, said spring being disposed intermediate the type wheel and one face of the disk, and electric contact elements for controlling the driving element carried by the other face of the disk, said disk providing means for adjusting the tension of said spring.

16. A type wheel unit comprising a type wheel, a driving element for the type wheel, an insulating disk co-axial with the type wheel and secured in fixed relation with the driving element, a spiral spring operatively connecting the type wheel with the disk for rotating the type wheel in accordance with the movement of the driving element, said spring being disposed intermediate the type wheel and one face of the disk, and electric contact elements carried by the other face of the disk for controlling the driving element, said disk being slotted at its periphery to provide means for adjusting the tension of said spring.

17. In a quotation board, a printing unit embodying a type wheel and means for rotating the same into printing position, said means including a ratchet wheel, an impulse pawl engaging said ratchet wheel to rotate the same step by step, said type wheel and said ratchet wheel having a limited relative angular movement, electro-magnet means for actuating said pawl, and a control commutator arranged to rotate with the ratchet wheel in fixed angular relation thereto for controlling the magnet in accordance with the position of the ratchet wheel, said commutator comprising a disk of non-conducting material, an inner and an outer annular conducting ring arranged to be secured on one face of said disk, and contact fingers carried by said printing unit and arranged to engage each of the annular conducting rings.

18. In a printing unit for items to be posted, a type wheel, means for rotating said type wheel into printing position, said means comprising a ratchet wheel, an impulse pawl engaging said ratchet wheel to rotate the same step by step, said type wheel and said ratchet wheel having a limited relative angular movement, and a resilient driving connection between said ratchet wheel and said type wheel, said connection comprising a spring disposed spirally about the axis of the type wheel and means to secure one end thereof in fixed relation to the ratchet wheel and means to secure the other end thereof in fixed relation to the type wheel.

19. In a quotation board printing unit, a type wheel actuating unit comprising a framework, a type wheel rotatively mounted therein, and means for rotating the type wheel into printing position, said means including an electro-magnet mounted on said framework and disposed substantially in the plane of the type wheel, said electro-magnet having a pivotally mounted armature disposed at the end thereof remote from the type wheel, a ratchet wheel operatively secured to the type wheel, and a pawl arm joined to and pivoted with said armature and extending to one side of the axis of the type wheel, said pawl arm carrying a pair of pivotally mounted pallets arranged to alternately engage the opposite sides of the ratchet wheel, a stop for each pallet secured to the framework and arranged to engage the respective pallets to limit the movement thereof while in rotative engagement with the ratchet wheel, said stops and said pallets being arranged to co-operate to lock the movement of the ratchet wheel as each of the respective pallets reaches the limit of its movement.

20. In a quotation board printing unit, a type wheel unit embodying a framework, a shaft secured to the framework, a rotatable sleeve on said shaft, a ratchet wheel secured to the sleeve, a type wheel mounted on the sleeve and having a hub portion surrounding the latter, said type wheel and said ratchet wheel having a limited relative angular movement, a disk carried by said sleeve and secured in fixed relation to the ratchet wheel, said disk comprising a sheet of non-conducting material and having a series of serrations in the periphery thereof, an impulse pawl engaging the ratchet wheel to rotate the same step by step, electro-magnetic means for actuating the pawl to drive the ratchet wheel, an electric circuit leading to the magnet to supply current therefor, a control commutator disposed in the circuit and comprising an inner and outer ring of conducting material secured to one face of the disk, a resilient driving connection between the ratchet wheel and type wheel comprising a spring disposed spirally about the shaft, and arranged between the ratchet wheel and the other face of the disk, said spring having its inner end fixedly secured to the hub of the type wheel and having a hook portion formed at its outer end which serves to adjustably secure the same in the serrations at the periphery of said disk, to vary the tension of the spring.

21. An integral character display unit comprising a character wheel, a driving element for the character wheel, a driving connection between said driving element and character wheel arranged to normally position said wheel in accordance with the position of said element, said connection having means to provide a torsional resilience only in the direction of the application of the driving force.

22. A character display unit assembly comprising a plurality of separate character display units, each unit comprising a framework, a character wheel, and means for driving the character wheel, said units being assembled with the character wheels in axial alinement.

23. A character display unit assembly comprising a plurality of integral character display units, each unit comprising a framework, a character wheel, means for independently rotating the character wheel of each unit, and an alining shaft common to all of the character units and arranged to pass through the axes of the character wheels for supporting the same in axial alinement.

24. A type wheel unit assembly comprising a plurality of integral type wheel units, each unit comprising a framework, a type wheel supported by the framework, means for independently rotating the type wheel of each unit, and a shaft common to all of the units and arranged to pass through the axes of the type wheels to support the same in axial alinement.

25. A character display unit comprising a character wheel, a ratchet wheel operatively secured to the character wheel, a pivotally mounted operating lever for driving the ratchet wheel, a magnet, said operating lever having an armature portion cooperating with the magnet to actuate the lever, the distance from the pivot point to the working end of the operating lever being several times greater than the distance from the pivot point to the armature.

26. In combination, a type wheel, a ratchet wheel secured thereto, a pair of pallets alternately engaging the ratchet wheel to rotate the same, and means for independently adjusting the operating stroke of each pallet, the combined movement imparted by the pallets operating the type wheel the distance of one character.

27. In combination, a type wheel, a ratchet wheel secured thereto, a pair of pallets alternately engaging the ratchet wheel to rotate the same, a common pawl arm carrying the pallets, and means for independently adjusting the operating stroke of each pallet, the combined movement imparted by the pallets operating the type wheel the distance of one character.

28. A character display unit comprising a rotatively mounted character wheel, a ratchet wheel operatively secured to the character wheel, a pivotally mounted pawl arm, an electro-magnet for operating the pawl arm in one direction, a retractable spring secured to the pawl arm and tensioned thereby as it moves in response to the magnet, whereby, when the magnet is deenergized the spring moves the pawl arm in the other direction, a pair of pallets carried by said pawl arm and arranged to alternately engage opposite sides of said ratchet wheel to rotate the same step by step, a stop pin for each pallet arranged to engage the respective pallets to limit the operating strokes thereof, said stop pins being adjustably mounted for varying the stroke of the pallets independently of each other.

RAY HOOVER.
EVAN R. WHEELER.